(Model.)
J. C. LOWEN.
COMBINED TRUCK AND LADDER.
No. 310,836. Patented Jan. 13, 1885.
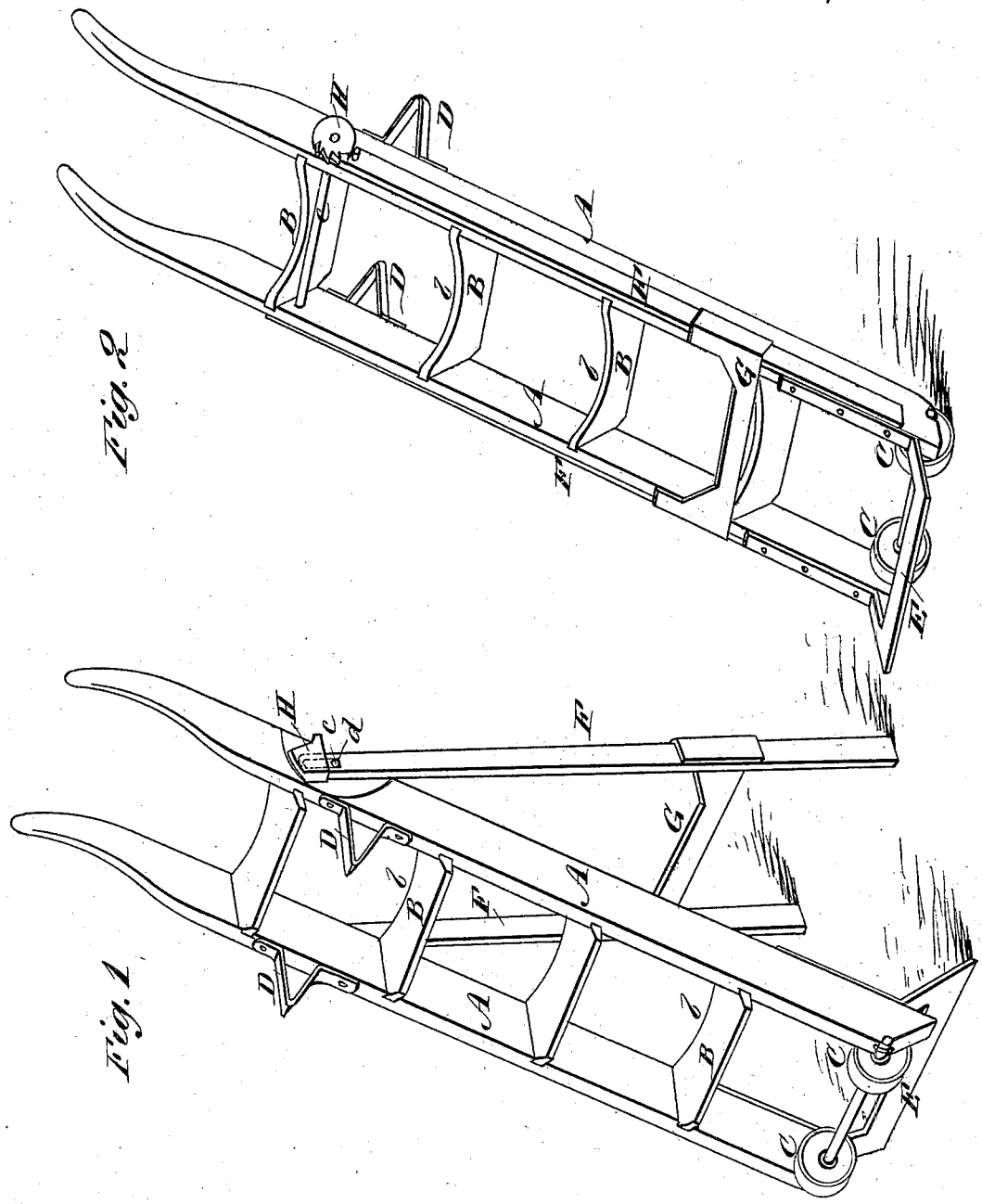
WITNESSES:
C. Neveux
C. Sedgwick
INVENTOR:
J. C. Lowen
BY Munn & Co.
ATTORNEYS.

UNITED STATES PATENT OFFICE.

JOHN C. LOWEN, OF TITUSVILLE, PENNSYLVANIA.

COMBINED TRUCK AND LADDER.

SPECIFICATION forming part of Letters Patent No. 310,836, dated January 13, 1885.

Application filed May 28, 1884. (Model.)

*To all whom it may concern:*

Be it known that I, JOHN C. LOWEN, of Titusville, in the county of Crawford and State of Pennsylvania, have invented a new and Improved Combined Truck and Ladder, of which the following is a full, clear, and exact description.

This invention consists in certain improvements in that class of trucks which are convertible into step-ladders, as will be hereinafter described and claimed. Heretofore these combined trucks and ladders have been constructed by hinging the standards to the under side of the side bars of the truck, near the upper ends of said side bars, and connecting said standards near their lower ends with the truck by a hinged brace. By this construction the standards could not fall automatically into position, and the truck could not rest on its "nose," but on its wheels.

Reference is to be had to the accompanying drawings, forming part of this specification, in which similar letters of reference indicate corresponding parts in both the figures.

Figure 1 represents a view in perspective of the combined truck and ladder when adjusted for use as a step-ladder, and Fig. 2 a like view of the same device when adjusted for use as a truck.

A A are the side bars of the truck, which may be made in the usual manner, and B B are its cross-bars, which may be made of any desired width and be mortised into or otherwise attached to the side bars, but which are set obliquely in direction of their width or depth to the side bars, to give a horizontal or approximately horizontal position to them when the device is adjusted for use as a step-ladder, as shown in Fig. 1. The edges *b* of said cross-bars or steps are or may be made concave, to provide for the device when used as a truck, as shown in Fig. 2, carrying barrels and like-shaped articles free from all risk of their rolling off.

C C are the wheels, D D the feet, and E the nose-iron, of the truck, all of which may be as ordinarily constructed and used on hand-trucks.

F F are standards connected with the truck near its handle ends on the sides of the side bars, A A, and fitted to swing, where connected, on the outer ends of a cross-rod, *c*, arranged to project through the side bars. These standards are made of the required length, so that when adjusted or spread out they will form the necessary support when the truck is converted into a step-ladder, as shown in Fig. 1. They are united at a suitable distance from their free ends by a metal brace, G, that not only serves to stiffen them, but when said standards are closed against the side bars, A A, also forms a guard for the forward or lower part of the truck. A slot, *d*, is made in the upper end of each standard or leg F, through which the cross-rod or pivot *c* projects. These slots, when the truck is adjusted to form a step-ladder, provide for the standards sliding upward on the ends of the rod *c*, and firmly entering or engaging by a pin or otherwise with any suitable locking device, H, which may either be an angular socket, as shown in Fig. 1, or a toothed disk, as shown in Fig. 2, and which serve to firmly hold or lock the standards or legs F F in position when the whole device is used as a step-ladder.

The ladder, as formed by or in connection with the truck, is much easier moved from place to place than if a separate structure, it being conveyed to the place needed in the form of a truck, and by simply tipping the truck forward on its nose-iron E the standards F swing outward, and when resting on the floor adjust themselves to form the back props of a step-ladder, which the truck is then converted into. A person may then ascend the ladder, take down the goods to be transported, descend the ladder, and with one hand reverse the combination, so that the whole device simply constitutes a truck again which can be moved away with the goods.

The motion necessary for conversion of the one device into another, it will be observed, is an automatic one. The standards or legs F not only lock when extended with the side bars of the truck through the locking devices provided for the purpose, but the slots *d* in them provide for the automatic disengagement of the legs or standards with the locking devices H when the whole device is handled or tilted to reconvert it from a step-ladder to a truck, and drop back to their places by the side bars, A A, where they are arrested by the guard or brace G.

The whole device can be manufactured at very little more expense than an ordinary truck, and by it a step-ladder can always be found when needed.

Having thus fully described my invention, I claim as new and desire to secure by Letters Patent—

1. The combination, with the truck having cross-braces B, of the side standards, F, pivoted to the sides of the bars A, and provided near their lower ends with cross-piece G, extending across the upper side of the truck, as shown, for holding the standards in place, and serving also as a guard for the lower or forward end of the truck-frame, whereby when the truck is raised on its nose the standards will automatically swing outward, substantially as described.

2. The combination, with the sides A of an ordinary truck, having cross-braces B, of the standards F, extensibly pivoted to the sides A near their upper or forward ends, and a locking device, H, secured to the sides A above or in rear of the pivots of the standards, whereby when the truck is raised on its nose the standards will automatically swing outward and into engagement with the locking devices, substantially as set forth.

3. The combination, with an ordinary truck having cross-braces B, of the standards F, slotted at $d$, and pivoted to the rod $c$ at the upper or rear end of the truck, as shown, locking device consisting of a socket-plate secured to the sides of the truck above or in rear of rod $c$, and the cross-brace G, connected to the lower or forward end of the standard, and adapted to rest on the upper surface of the truck when folded, all constructed and arranged substantially as set forth.

JOHN C. LOWEN.

Witnesses:
WM. H. CORNELL,
A. K. HOWARD.